US008597113B2

(12) United States Patent
Anderson et al.

(10) Patent No.: US 8,597,113 B2
(45) Date of Patent: *Dec. 3, 2013

(54) GAMING MACHINE WITH SEPARATELY SELECTABLE WAGERING GAMES

(75) Inventors: Peter R. Anderson, Glenview, IL (US); Damon E. Gura, Chicago, IL (US); Robert L. Kyte, Chicago, IL (US); Larry J. Pacey, Chicago, IL (US); Matthew J. Ward, Chicago, IL (US)

(73) Assignee: WMS Gaming Inc., Waukegan, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 13/494,719

(22) Filed: Jun. 12, 2012

(65) Prior Publication Data

US 2012/0264505 A1 Oct. 18, 2012

Related U.S. Application Data

(63) Continuation of application No. 12/440,963, filed as application No. PCT/US2007/019804 on Sep. 11, 2007, now Pat. No. 8,221,228.

(60) Provisional application No. 60/844,032, filed on Sep. 12, 2006.

(51) Int. Cl.
*A63F 13/00* (2006.01)

(52) U.S. Cl.
USPC .............................................. 463/25; 463/42

(58) Field of Classification Search
USPC ........................................ 463/16–30, 40–42
See application file for complete search history.

(56) References Cited

U.S. PATENT DOCUMENTS

| | | | |
|---|---|---|---|
| 5,083,271 | A | 1/1992 | Thacher et al. |
| 5,655,961 | A | 8/1997 | Acres et al. |
| 5,761,649 | A | 6/1998 | Hill |
| 5,851,149 | A | 12/1998 | Xidos et al. |
| 6,217,448 | B1 | 4/2001 | Olsen |
| RE37,885 | E | 10/2002 | Acres et al. |
| 6,645,077 | B2 | 11/2003 | Rowe |
| 6,656,048 | B2 | 12/2003 | Olsen |
| 6,843,723 | B2 | 1/2005 | Joshi |
| 6,939,226 | B1 | 9/2005 | Joshi |

(Continued)

FOREIGN PATENT DOCUMENTS

| | | |
|---|---|---|
| AU | 2005/251830 | 12/2005 |
| GB | 2 405 813 A | 3/2005 |

(Continued)

OTHER PUBLICATIONS

Written Opinion corresponding to co-pending International Patent Application Serial No. PCT/US2007/19804, United States Patent Office, dated May 1, 2008. (6).

(Continued)

*Primary Examiner* — Masud Ahmed
(74) *Attorney, Agent, or Firm* — Nixon Peabody LLP

(57) ABSTRACT

A gaming system for conducting a wagering game allows players, casino operators, and/or gaming machine manufacturers to selectively combine base games and bonus games. This modular approach allows players, casino operators, and/or gaming machine manufacturers to mix and match base games and bonus games as needed. In some embodiments, players, casino operators, and/or gaming machine manufacturers may also select different game features to employ in the bonus and/or base games. Such an arrangement allows players, casino operators, and/or gaming machine manufacturers to configure each base game and/or bonus game according to their preferences.

25 Claims, 9 Drawing Sheets

(56) References Cited

U.S. PATENT DOCUMENTS

| | | | |
|---|---|---|---|
| RE38,812 | E | 10/2005 | Acres et al. |
| 6,960,136 | B2 | 11/2005 | Joshi et al. |
| 6,974,385 | B2 | 12/2005 | Joshi et al. |
| 6,991,543 | B2 | 1/2006 | Joshi |
| 7,144,321 | B2 | 12/2006 | Mayeroff |
| 7,285,049 | B1 | 10/2007 | Luciano, Jr. et al. |
| 7,666,094 | B2 | 2/2010 | Baerlocher et al. |
| 7,674,178 | B2 | 3/2010 | Baerlocher et al. |
| 7,674,179 | B2 | 3/2010 | Baerlocher et al. |
| 7,677,971 | B2 | 3/2010 | Baerlocher et al. |
| 7,677,972 | B2 | 3/2010 | Baerlocher et al. |
| 7,682,248 | B2 | 3/2010 | Baerlocher et al. |
| 7,934,989 | B2 | 5/2011 | Joshi et al. |
| 8,147,323 | B2 | 4/2012 | Joshi et al. |
| 2001/0004607 | A1 | 6/2001 | Olsen |
| 2006/0040736 | A1 | 2/2006 | Baerlocher et al. |
| 2006/0052148 | A1 | 3/2006 | Blair, Jr. et al. |
| 2006/0073887 | A1 | 4/2006 | Nguyen et al. |
| 2006/0073888 | A1 | 4/2006 | Nguyen et al. |
| 2006/0142079 | A1 | 6/2006 | Ikehara et al. |
| 2007/0060314 | A1 | 3/2007 | Baerlocher et al. |
| 2007/0060321 | A1 | 3/2007 | Vasquez et al. |
| 2007/0191088 | A1 | 8/2007 | Breckner et al. |
| 2007/0218975 | A1 | 9/2007 | Iddings et al. |
| 2007/0259709 | A1 | 11/2007 | Kelly et al. |
| 2007/0293293 | A1 | 12/2007 | Baerlocher et al. |
| 2007/0298857 | A1 | 12/2007 | Schlottmann et al. |
| 2007/0298874 | A1 | 12/2007 | Baerlocher et al. |
| 2007/0298875 | A1 | 12/2007 | Baerlocher et al. |
| 2008/0020830 | A1 | 1/2008 | Ikehara et al. |
| 2008/0020831 | A1 | 1/2008 | Ikehara et al. |
| 2008/0020832 | A1 | 1/2008 | Iddings et al. |
| 2008/0020833 | A1 | 1/2008 | Baerlocher et al. |
| 2008/0020834 | A1 | 1/2008 | Breckner et al. |
| 2008/0020846 | A1 | 1/2008 | Vasquez et al. |
| 2008/0045344 | A1 | 2/2008 | Schlottmann et al. |
| 2008/0064502 | A1 | 3/2008 | Schlottmann et al. |
| 2008/0070680 | A1 | 3/2008 | Baerlocher et al. |
| 2008/0070692 | A1 | 3/2008 | Schlottmann et al. |
| 2008/0070693 | A1 | 3/2008 | Schlottmann et al. |
| 2008/0070694 | A1 | 3/2008 | Schlottmann et al. |
| 2008/0070695 | A1 | 3/2008 | Baerlocher et al. |
| 2008/0076514 | A1 | 3/2008 | Baerlocher et al. |
| 2008/0076515 | A1 | 3/2008 | Baerlocher et al. |
| 2008/0076517 | A1 | 3/2008 | Baerlocher et al. |
| 2008/0076552 | A1 | 3/2008 | Baerlocher et al. |
| 2008/0113770 | A1 | 5/2008 | Gelber et al. |
| 2009/0117969 | A1 | 5/2009 | Englman |
| 2009/0143136 | A1 | 6/2009 | Thomas |
| 2009/0186692 | A1 | 7/2009 | Thomas et al. |
| 2009/0291752 | A1 | 11/2009 | Anderson et al. |
| 2009/0305776 | A1 | 12/2009 | Englman et al. |
| 2010/0029369 | A1 | 2/2010 | Pacey |
| 2010/0048283 | A1 | 2/2010 | Anderson et al. |
| 2010/0048293 | A1 | 2/2010 | Hornik |
| 2010/0062841 | A1 | 3/2010 | Englman et al. |
| 2010/0075746 | A1 | 3/2010 | Anderson et al. |
| 2010/0087256 | A1 | 4/2010 | Frattinger et al. |
| 2010/0216544 | A1 | 8/2010 | Hamlin |
| 2010/0234105 | A1 | 9/2010 | Gagner et al. |
| 2010/0248818 | A1 | 9/2010 | Aoki et al. |
| 2010/0255900 | A1 | 10/2010 | Ansari et al. |
| 2010/0255901 | A1 | 10/2010 | Garvey et al. |
| 2010/0255912 | A1 | 10/2010 | Ward |
| 2010/0261521 | A1 | 10/2010 | Oatman et al. |
| 2010/0291998 | A1 | 11/2010 | Anderson et al. |
| 2010/0317433 | A1 | 12/2010 | Ansari et al. |
| 2011/0034237 | A1 | 2/2011 | Schulhof et al. |
| 2011/0053672 | A1 | 3/2011 | Gagner et al. |
| 2011/0212785 | A1 | 9/2011 | Gura et al. |
| 2011/0230254 | A1 | 9/2011 | Englman et al. |
| 2011/0250955 | A1 | 10/2011 | Adiraju et al. |
| 2011/0287828 | A1 | 11/2011 | Anderson et al. |
| 2011/0300925 | A1 | 12/2011 | Adiraju et al. |
| 2012/0077564 | A1 | 3/2012 | Collette et al. |

FOREIGN PATENT DOCUMENTS

| | | | |
|---|---|---|---|
| WO | WO 00/17825 | A2 | 3/2000 |
| WO | WO 2005/120672 | A1 | 12/2005 |
| WO | WO 2006/017068 | A1 | 2/2006 |
| WO | WO 2007/006002 | A2 | 1/2007 |
| WO | WO 2007/139874 | A2 | 12/2007 |
| WO | WO 2007/139988 | A2 | 12/2007 |
| WO | WO 2008/030904 | A2 | 3/2008 |
| WO | WO 2008/033392 | A2 | 3/2008 |
| WO | WO 2008/039403 | A2 | 4/2008 |
| WO | WO 2008/060426 | A2 | 5/2008 |
| WO | WO 2008/060442 | A2 | 5/2008 |
| WO | WO 2008/060459 | A2 | 5/2008 |
| WO | WO 2008/060513 | A2 | 5/2008 |
| WO | WO 2006/076185 | A2 | 7/2009 |

OTHER PUBLICATIONS

International Search Report corresponding to co-pending International Patent Application Serial No. PCT/US2007/19804, United States Patent Office, dated May 1, 2008. (2).

GAMING MACHINE WITH SEPARATELY SELECTABLE WAGERING GAMES

CROSS REFERENCE TO RELATED APPLICATIONS

This application is a continuation of U.S. application Ser. No. 12/440,963, filed Mar. 12, 2009, now allowed, which is a U.S. national stage of International Application No. PCT/US2007/019804, filed Sep. 11, 2007, which claims the benefit of U.S. Provisional Application No. 60/844,032, filed Sep. 12, 2006, each of which is incorporated by reference herein in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, and methods for playing wagering games, and more particularly, to gaming machines with separately selectable wagering games.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "base" game. The bonus game may comprise any type of game, either similar to or completely different from the base game, which is entered upon the occurrence of a selected event or outcome in the base game. Generally, bonus games provide a greater expectation of winning than the base game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines.

In most gaming machines, the base games and bonus games, including progressive jackpots and other communal games, are linked together as a single integrated package. Thus, for a given gaming machine, the same base game always triggers the same bonus game or set of bonus games. Of course, game designers try to match base games and bonus games that compliment one another so that the combination provides an enhanced overall gaming experience. But while the above arrangement has mostly proven successful, it provides players, casino operators, and/or gaming machine manufacturers with few options. For example, consider the case where the base game is highly popular among players, but the associated bonus game is not (or vice versa). If players want to play the base game, they must tolerate the bonus game (and vice versa), which may dampen their enthusiasm for the base game. For casino operators, swapping out the less popular bonus game requires recertification of the entire package, as the two games are linked together. Indeed, in some regulatory jurisdictions, recertification is required even for changes to just the features of the base games and/or bonus games.

Accordingly, there is a continuing need to develop gaming machines with more options for players, casino operators, and/or gaming machine manufacturers. More particularly, there is a need to develop gaming machines where the base games and/or bonus games, and/or the features thereof, may be selected as needed by players, casino operators, and/or gaming machine manufacturers.

SUMMARY OF THE INVENTION

According to one aspect of the present invention, a gaming machine for conducting a wagering game comprises a wager input device for receiving a wager input from a player for playing a base wagering game and at least one display operable to display an outcome of the base wagering game, the outcome of the base wagering game randomly being selected from a plurality of base wagering game outcomes. The at least one display is further operable to display an outcome of a bonus wagering game, the outcome of the bonus wagering game being randomly selected from a plurality of bonus wagering game outcomes. The base wagering game and the bonus wagering game are downloaded independently of one another to the gaming machine.

According to another aspect of the invention, a method of conducting a wagering game on a gaming machine comprises downloading a primary wagering game to the gaming machine, the primary wagering game being selected from a plurality of primary wagering games. The method further comprises downloading a secondary wagering game to the gaming machine independently of the primary wagering game, the secondary wagering game being selected from a plurality of secondary wagering games. A wager input is received at the gaming machine from a player for playing the primary wagering game, and an outcome of the primary wagering game is displayed, the outcome of the primary wagering game being randomly selected from a plurality of primary wagering game outcomes. An outcome of the secondary wagering game is also displayed, the outcome of the secondary wagering game being randomly selected from a plurality of secondary wagering game outcomes.

According to yet another aspect of the invention, a system for downloading wagering games to a gaming machine comprises a network and a storage unit connected to the network, the storage unit storing a plurality of base wagering game packages and a plurality of bonus wagering game packages. The system further comprises a game server connected to the storage unit, the game server configured to access the base wagering game packages and the bonus wagering game packages stored on the storage unit. At least one gaming machine is connected to the game server, the gaming machine configured to receive the base wagering game packages and the bonus wagering game packages from the storage unit. The game server is further configured to download at least one of the base wagering game packages and at least one of the bonus wagering game packages independently of each other to the gaming machine.

Additional aspects of the invention will be apparent to those of ordinary skill in the art in view of the detailed description of various embodiments, which is made with reference to the drawings, a brief description of which is provided below.

DETAILED DESCRIPTION

Figure 1A:
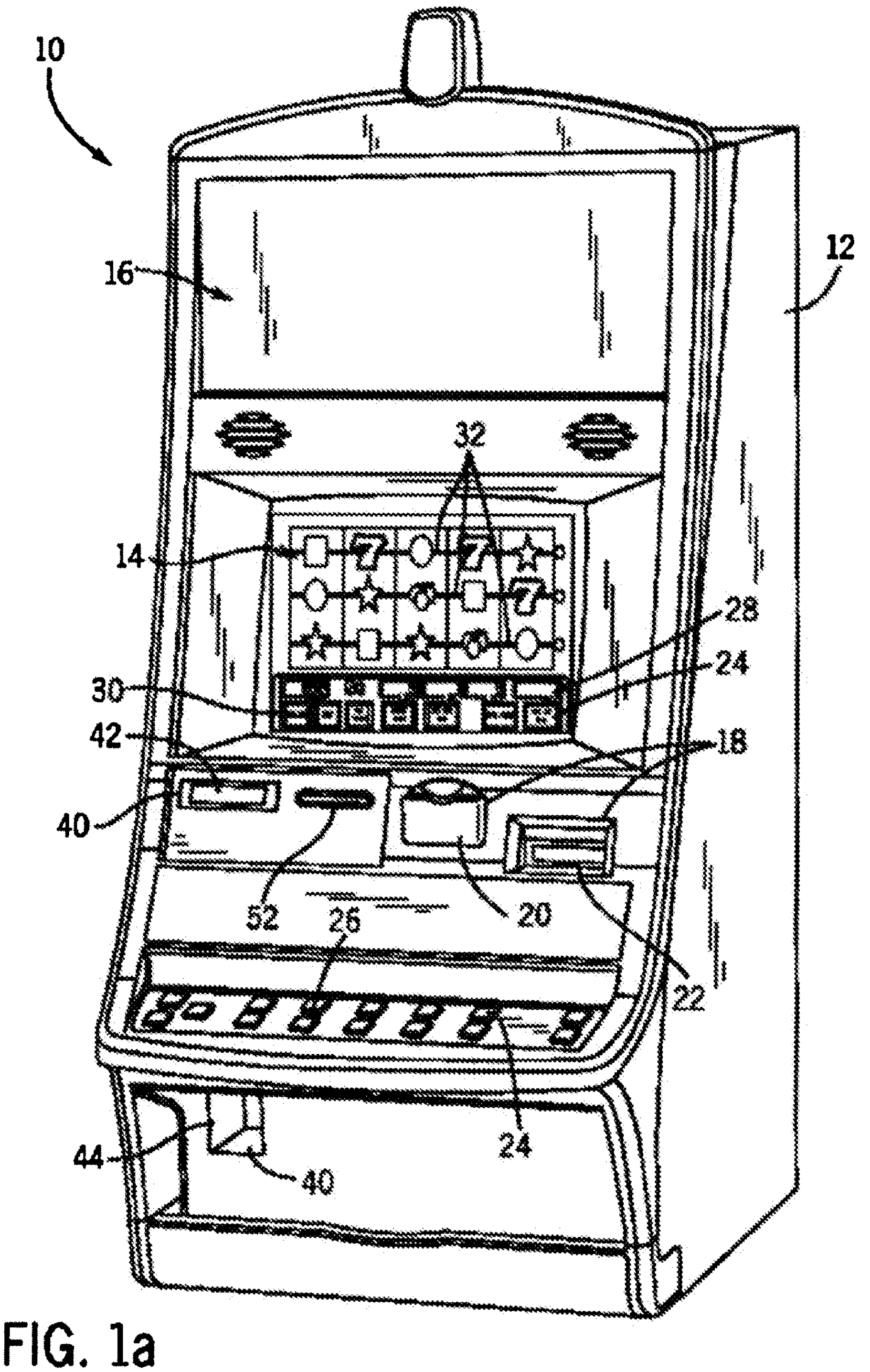
FIGS. 1*a* and 1*b* illustrate a free standing gaming machine and a handheld gaming machine, respectively, embodying the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1*a*, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as blackjack, slots, keno, poker, blackjack, roulette, etc.

The gaming machine 10 comprises a housing 12 and includes input devices, including a value input device 18 and a player input device 24. For output the gaming machine 10 includes a primary display 14 for displaying information about the base wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1*a*). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1*a*, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the base wagering game is displayed to the player on the primary display 14. The primary display 14 can also display the bonus game associated with the base wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire display (or a portion thereof) to allow players to make game-related selections. Alternatively, the primary display 14 of the gaming machine 10 may include a number of mechanical reels to display the outcome in visual association with at least one payline 32. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the base wagering game by making a wager via the value input device 18 of the gaming machine 10. A player can select play by using the player input device 24, via the buttons 26 or the touch screen keys 30. The base game consists of a plurality of symbols arranged in an array, and includes at least one payline 32 that indicates one or more outcomes of the base game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1*a* as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 1B:
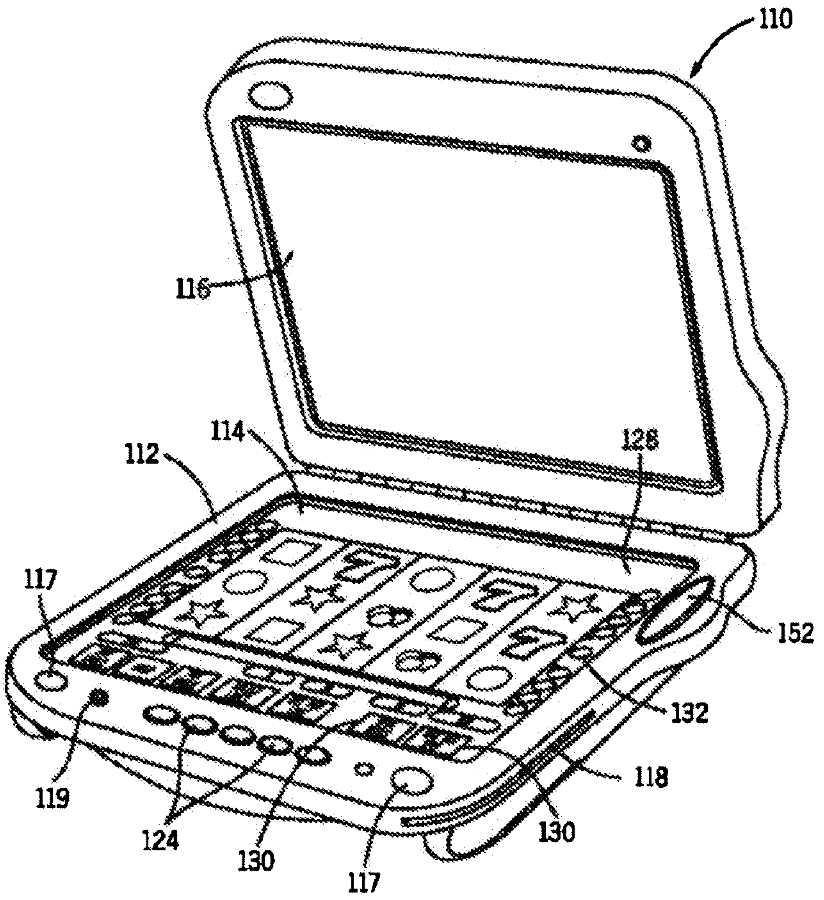

Depicted in FIG. 1*b* is a handheld or mobile gaming machine 110. Like the free standing gaming machine 10, the handheld gaming machine 110 is preferably an electronic gaming machine configured to play a video casino game such as, but not limited to, blackjack, slots, keno, poker, blackjack, and roulette. The handheld gaming machine 110 comprises a housing or casing 112 and includes input devices, including a value input device 118 and a player input device 124. For output the handheld gaming machine 110 includes, but is not limited to, a primary display 114, a secondary display 116, one or more speakers 117, one or more player-accessible ports 119 (e.g., an audio output jack for headphones, a video headset jack, etc.), and other conventional I/O devices and ports, which may or may not be player-accessible. In the embodiment depicted in FIG. 1*b*, the handheld gaming machine 110 comprises a secondary display 116 that is rotatable relative to the primary display 114. The optional secondary display 116 may be fixed, movable, and/or detachable/attachable relative to the primary display 114. Either the primary display 114 and/or secondary display 116 may be configured to display any aspect of a non-wagering game, wagering game, secondary games, bonus games, progressive wagering games, group games, shared-experience games or events, game events, game outcomes, scrolling information, text messaging, emails, alerts or announcements, broadcast information, subscription information, and handheld gaming machine status.

The player-accessible value input device 118 may comprise, for example, a slot located on the front, side, or top of the casing 112 configured to receive credit from a stored-value card (e.g., casino card, smart card, debit card, credit card, etc.) inserted by a player. In another aspect, the player-accessible value input device 118 may comprise a sensor (e.g., an RF sensor) configured to sense a signal (e.g., an RF signal) output by a transmitter (e.g., an RF transmitter) carried by a player. The player-accessible value input device 118 may also or alternatively include a ticket reader, or barcode scanner, for reading information stored on a credit ticket, a card, or other tangible portable credit or funds storage device. The credit ticket or card may also authorize access to a central account, which can transfer money to the handheld gaming machine 110.

Still other player-accessible value input devices 118 may require the use of touch keys 130 on the touch-screen display (e.g., primary display 114 and/or secondary display 116) or player input devices 124. Upon entry of player identification information and, preferably, secondary authorization information (e.g., a password, PIN number, stored value card number, predefined key sequences, etc.), the player may be permitted to access a player's account. As one potential optional security feature, the handheld gaming machine 110 may be configured to permit a player to only access an account the player has specifically set up for the handheld gaming machine 110. Other conventional security features may also be utilized to, for example, prevent unauthorized access to a player's account, to minimize an impact of any unauthorized access to a player's account, or to prevent unauthorized access to any personal information or funds temporarily stored on the handheld gaming machine 110.

The player-accessible value input device 118 may itself comprise or utilize a biometric player information reader which permits the player to access available funds on a player's account, either alone or in combination with another of the aforementioned player-accessible value input devices 118. In an embodiment wherein the player-accessible value input device 118 comprises a biometric player information reader, transactions such as an input of value to the handheld device, a transfer of value from one player account or source to an account associated with the handheld gaming machine 110, or the execution of another transaction, for example, could all be authorized by a biometric reading, which could comprise a plurality of biometric readings, from the biometric device.

Alternatively, to enhance security, a transaction may be optionally enabled only by a two-step process in which a secondary source confirms the identity indicated by a primary source. For example, a player-accessible value input device 118 comprising a biometric player information reader may require a confirmatory entry from another biometric player information reader 152, or from another source, such as a credit card, debit card, player ID card, fob key, PIN number, password, hotel room key, etc. Thus, a transaction may be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 118 may be provided remotely from the handheld gaming machine 110.

The player input device 124 comprises a plurality of push buttons on a button panel for operating the handheld gaming machine 110. In addition, or alternatively, the player input device 124 may comprise a touch screen 128 mounted to a primary display 114 and/or secondary display 116. In one aspect, the touch screen 128 is matched to a display screen having one or more selectable touch keys 130 selectable by a user's touching of the associated area of the screen using a finger or a tool, such as a stylus pointer. A player enables a desired function either by touching the touch screen 128 at an appropriate touch key 130 or by pressing an appropriate push button 126 on the button panel. The touch keys 130 may be used to implement the same functions as push buttons 126. Alternatively, the push buttons may provide inputs for one aspect of the operating the game, while the touch keys 130 may allow for input needed for another aspect of the game. The various components of the handheld gaming machine 110 may be connected directly to, or contained within, the casing 112, as seen in FIG. 1*b*, or may be located outboard of the casing 112 and connected to the casing 112 via a variety of hardwired (tethered) or wireless connection methods. Thus, the handheld gaming machine 110 may comprise a single unit or a plurality of interconnected parts (e.g., wireless connections) which may be arranged to suit a player's preferences.

The operation of the base wagering game on the handheld gaming machine 110 is displayed to the player on the primary display 114. The primary display 114 can also display the bonus game associated with the base wagering game. The primary display 114 preferably takes the form of a high resolution LCD, a plasma display, an LED, or any other type of display suitable for use in the handheld gaming machine 110. The size of the primary display 114 may vary from, for example, about a 2-3" display to a 15" or 17" display. In at least some aspects, the primary display 114 is a 7"-10" display. As the weight of and/or power requirements of such displays decreases with improvements in technology, it is envisaged that the size of the primary display may be increased. Optionally, coatings or removable films or sheets may be applied to the display to provide desired characteristics (e.g., anti-scratch, anti-glare, bacterially-resistant and anti-microbial films, etc.). In at least some embodiments, the primary display 114 and/or secondary display 116 may have a 16:9 aspect ratio or other aspect ratio (e.g., 4:3). The primary display 114 and/or secondary display 116 may also each have different resolutions, different color schemes, and different aspect ratios.

As with the free standing gaming machine 10, a player begins play of the base wagering game on the handheld gaming machine 110 by making a wager (e.g., via the value input device 18 or an assignment of credits stored on the handheld gaming machine via the touch screen keys 130, player input device 124, or buttons 126) on the handheld gaming machine 110. In at least some aspects, the base game may comprise a plurality of symbols arranged in an array, and includes at least one payline 132 that indicates one or more outcomes of the base game. Such outcomes are randomly selected in response to the wagering input by the player. At least one of the plurality of randomly selected outcomes may be a start-bonus outcome, which can include any variations of symbols or symbol combinations triggering a bonus game.

In some embodiments, the player-accessible value input device 118 of the handheld gaming machine 110 may double as a player information reader 152 that allows for identification of a player by reading a card with information indicating the player's identity (e.g., reading a player's credit card, player ID card, smart card, etc.). The player information reader 152 may alternatively or also comprise a bar code scanner, RFID transceiver or computer readable storage medium interface. In one presently preferred aspect, the player information reader 152, shown by way of example in FIG. 1*b*, comprises a biometric sensing device.

Figure 2:
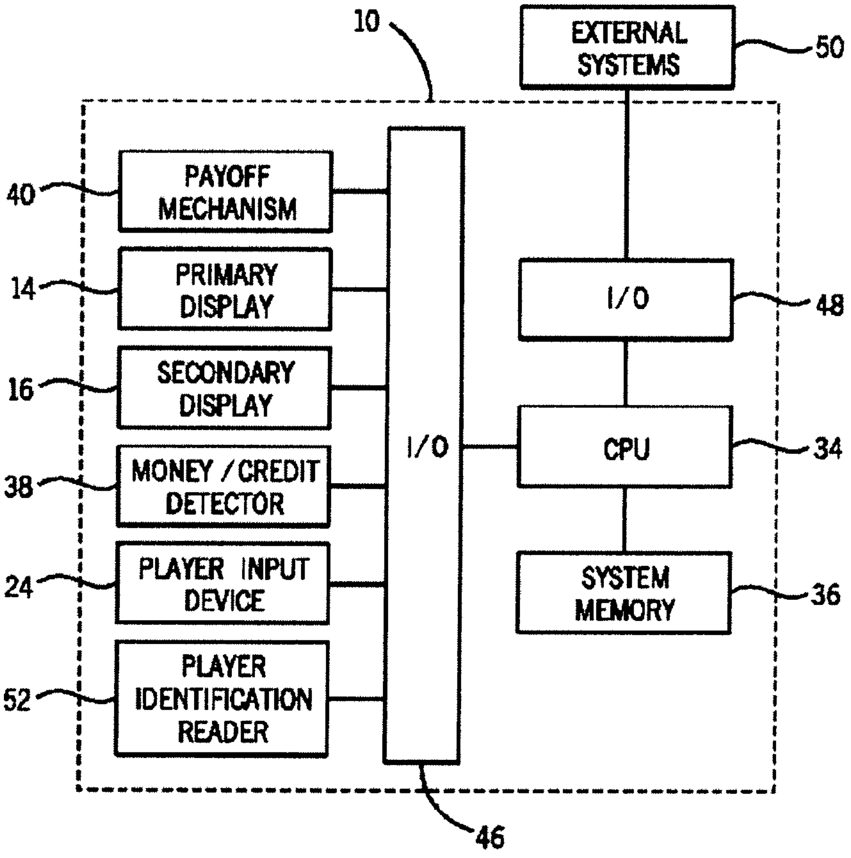
FIG. 2 illustrates a control system suitable for operating the gaming machines of FIGS. 1*a* and 1*b* according to embodiments of the invention.

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the base game or the bonus game(s). The payoff may be provided in the form of points, bills, tickets, coupons, cards, etc. For example, in FIG. 1*a*, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10 bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36. The controller 34 may reside partially or entirely inside or outside of the machine 10. The control system for a handheld gaming machine 110 may be similar to the control system for the free standing gaming machine 10 except that the functionality of the respective on-board controllers may vary.

The gaming machines 10, 110 may communicate with external systems 50 (in a wired or wireless manner) such that each machine operates as a "thin client," having relatively less functionality, a "thick client," having relatively more functionality, or through any range of functionality therebetween (e.g., a "rich client"). As a generally "thin client," the gaming machine may operate primarily as a display device to display the results of gaming outcomes processed externally, for example, on a server as part of the external systems 50. In this "thin client" configuration, the server executes game code and determines game outcomes (e.g., with a random number generator), while the controller 34 on board the gaming machine processes display information to be displayed on the display(s) of the machine. In an alternative "rich client" configuration, the server determines game outcomes, while the controller 34 on board the gaming machine executes game code and processes display information to be displayed on the display(s) of the machines. In yet another alternative "thick client" configuration, the controller 34 on board the gaming machine 110 executes game code, determines game outcomes, and processes display information to be displayed on the display(s) of the machine. Numerous alternative configurations are possible such that the aforementioned and other functions may be performed onboard or external to the gaming machine as may be necessary for particular applications. It should be understood that the gaming machines 10, 110 may take on a wide variety of forms such as a free standing machine, a portable or handheld device primarily used for gaming, a mobile telecommunications device such as a mobile telephone or personal daily assistant (PDA), a counter top or bar top gaming machine, or other personal electronic device such as a portable television, MP3 player, entertainment device, etc.

As mentioned above, in existing gaming machines, the base games and the bonus games, including progressive jackpots and other communal games, are part of a single integrated gaming package. As a result, players, casino operators, and/or gaming machine manufacturers have few options in terms of being able to choose a different bonus game to play with a particular base game (and vice versa) for a given gaming machine. Embodiments of the invention provide a gaming machine system and method in which the base games and/or the bonus games may be selected for gameplay independently of one another. This modular approach allows a player, casino operator, and/or gaming machine maker (hereinafter "user") to mix and match base games and bonus games as needed via an appropriate user interface. In some embodiments, the user may also select different features to employ with each bonus and/or base game. Such a mix and match gaming arrangement allows different users to customize each gaming machine with base games and/or bonus games according to their particular preferences.

Figure 3:
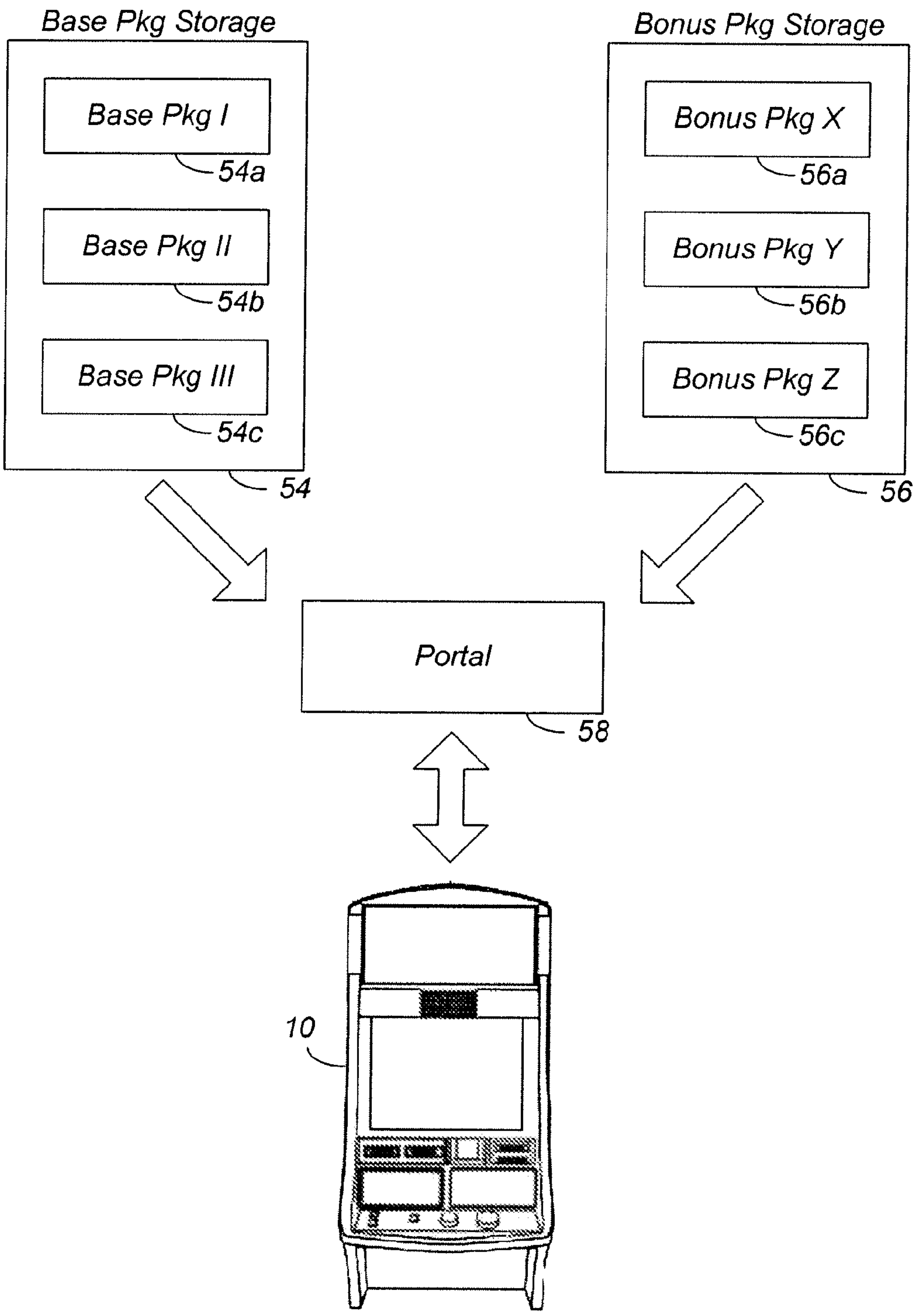
FIG. 3 illustrates an exemplary method for selectively combining base games and bonus games according to embodiments of the invention.

The above gaming arrangement is graphically illustrated in FIG. 3, where a plurality of individual base game packages 54*a*, 54*b*, and 54*c* and bonus game packages 56*a*, 56*b*, and 56*c* are available for selection and download. To this end, these base game packages 54*a-c* and bonus game packages 56*a-c* may be stored in a base game storage unit 54 and a bonus game storage unit 56, respectively. The base game and bonus game storage units 54 and 56 are provided for illustrative purposes only, however, and it is possible to store the base game and bonus game packages 54*a-c* and 56*a-c* in some other form if desired, for example, in a single storage unit. A portal 58 is also provided for controlling access to the base and bonus game storage units 54 and 56 and to the contents thereof. Any gaming machine 10 may then connect to the portal 58 and download selected ones of the base game packages 54*a-c* and/or bonus game packages 56*a-c* for gameplay.

In operation, instead of the integrated base game/bonus game approach used in existing gaming machines, each base game package 54*a-c* and each bonus game package 56*a-c* may be separately selected and downloaded. That is, the selection and download of the base game packages 54*a-c* may be independent of the selection and download of the bonus game packages 56*a-c*, and vice versa. Such a gaming arrangement provides users with the flexibility to mix and match base games and bonus games in a single gaming machine 10, thereby creating a more desirable combination. The timing of the download may be in real time (e.g., during gameplay), or one or more base game packages 54*a-c* and/or bonus game packages 56*a-c* may be downloaded ahead of time and stored on the gaming machine 10 for subsequent gameplay. Note that although the gaming machine 10 shown here is a free standing gaming machine, embodiments of the invention are fully applicable to handheld, bartop, and workstation models as well.

Figure 4:
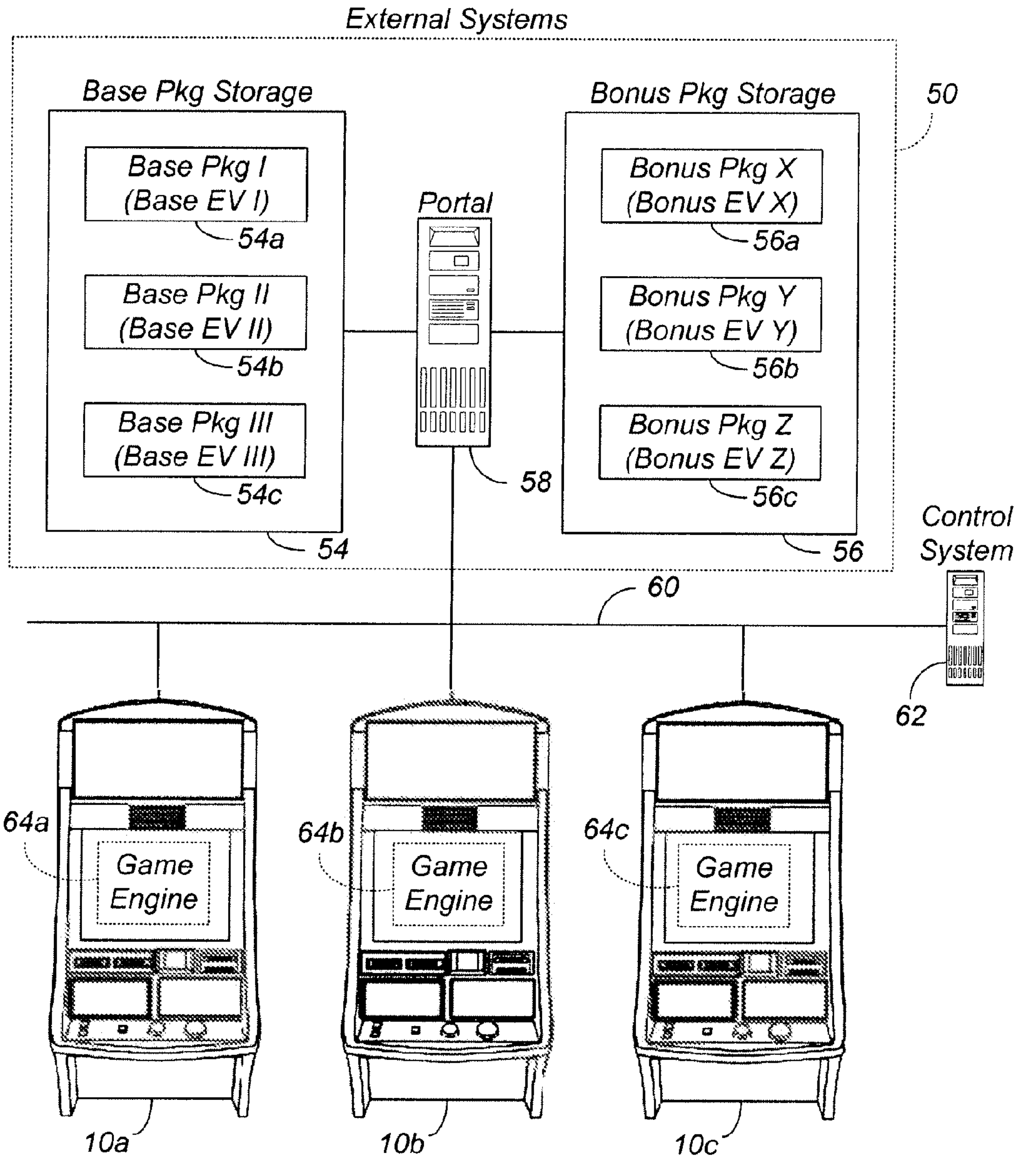
FIG. 4 illustrates an exemplary system for selectively combining base games and bonus games according to embodiments of the invention.

FIG. 4 illustrates an exemplary systems implementation of the gaming arrangement shown in FIG. 3. In this implementation, the base and bonus game storage units 54 and 56 (and the base game and bonus game packages 54*a-c* and 56*a-c* therein) as well as the portal 58 are part of the external systems 50 mentioned previously. A plurality of gaming machines 10*a*, 10*b*, and 10*c* is then connected to the external systems 50 via the portal 58. A network 60 provides the connection between the gaming machines 10*a-c* and the portal 58. Also connected to the network 60 (via the portal 58) are one or more control systems 62 for allowing a casino operator and/or gaming machine manufacturer to access the portal 58. Each of the components is described briefly below.

The base game and bonus game storage units 54 and 56 may be any suitable storage devices known to those having ordinary skill in the art, including one or more computer-readable storage media. Examples of such computer-readable storage media include a magnetic disk and an optical disk on which the base game and bonus game packages 54*a-c* and 56*a-c* may reside. The base game and bonus game packages 54*a-c* and 56*a-c* may then be stored as computer-readable instructions on the base game and bonus game storage units 54 and 56, respectively.

The portal 58 serves essentially as an electronic gateway between the gaming machines 10*a-c* and the base game and bonus game storage units 54 and 56 to control access to, security for, and transfer of the base game and bonus game packages 54*a-c* and 56*a-c* from their respective storage units to the gaming machines 10*a-c*. In one embodiment, the portal 58 may be any suitable server known to those having ordinary skill in the art, including a web server capable of communicating with the gaming machines 10*a-c* and the control systems 62 over the Internet. And although only one portal 58 is shown, those having ordinary skill in the art will understand that multiple portals 58 may be deployed on the network 60 as needed.

Similarly, the network 60 may be any suitable network known to those having ordinary skill in the art, including a wide area network (WAN) providing communication between a plurality of casinos, one or more local area networks (LAN) providing intra-casino communication, and the like. The communication over the network 60 may be transmitted via wired and/or wireless connections, and may employ any suitable communication technology, including Bluetooth, 802.11, Ethernet, public switched telephone networks, SONET, and the like.

The gaming machines 10*a-c* may likewise take any suitable form, including the free standing models 10 and the handheld, bartop, and workstation models 110 discussed above with respect to FIGS. 1*a*-1*b* and 2. Other devices that may be connected to the network 60 may include accounting servers, wide area progressive servers, local area progressive servers, and/or other servers known to those having ordinary skill in the art.

The one or more control systems 62, as mentioned above, allow a casino operator and/or gaming machine manufacturer to access the portal 58 over the network 60. In contrast, players typically access the portal 58 through the gaming machines 10*a-c*. The casino operator and/or gaming machine manufacturer may then use the control systems 62 to select and download, either in real time or beforehand, certain ones of the base game and bonus game packages 54*a-c* and 56*a-c* for specific gaming machines 10*a-c*. The control systems 62 also allow the casino operator and/or gaming machine manufacturer to track which base game and/or bonus game packages 54*a-c* and 56*a-c* are being downloaded by players and, if desired, configure or otherwise established certain predetermined rules regarding which base game packages 54*a-c* and bonus game packages 56*a-c* may be combined together. The casino operator and/or gaming machine manufacturer may also set up certain default base game and/or bonus game packages 54*a-c* and 56*a-c* for certain players based on their predefined preferences and/or selection history.

To execute the base game and bonus game packages 54*a-c* and 56*a-c*, a game engine 64*a*, 64*b*, and 64*c* is provided on each gaming machine 10*a-c*. The game engine 64*a-c*, in some embodiments, is not in and of itself a complete base game or bonus game, but is instead a shell or platform that may be used by the controller 34 (FIG. 2) and/or other components in the gaming machine 10*a-c* to produce a complete base game or bonus game. In this regard, the game engine 64*a-c* may be more akin to the "thick client" described previously. Operationally, the game engine 64*a-c* may provide systems services (e.g., network connectivity, player selection control, etc.), random number generation, video and/or audio content control, and various administrative functions in addition to running the base game and bonus game packages 54*a-c* and 56*a-c*. One or more base game and/or bonus game packages 54*a-c* and 56*a-c* may then be selectively downloaded from the network 60 and run on the game engine 64*a-c* to produce a specific base game and/or bonus game. Such a gaming arrangement not only allows mixing and matching of base games and bonus games, but may also provide regulatory advantages in some jurisdictions insofar as only the base game and/or bonus game packages 54*a-c* and 56*a-c* need to be certified once the game engine 64*a-c* has been certified, thus reducing the overall amount of time required for certification.

As for the base game and bonus game packages 54*a-c* and 56*a-c* themselves, in some embodiments, these packages may contain the instruction sets (i.e., computer-executable codes, script commands, game logic, math configuration files, etc.) for telling the game engine 64*a-c* how to reproduce the base games and bonus games. For example, the base game packages 54*a-c* may contain instructions regarding the number of reels in the base game, symbol placements, bonus game triggers, and the like. Similarly, the bonus game packages 56*a-c* may contain instructions regarding the type of bonus game (e.g., player-selection game, free-spins game, progressive jackpot eligibility bonus game, etc.), or the configuration of the bonus game (e.g., array size, game-ending mechanism, etc.). Alternatively, the base game and bonus game packages 54*a-c* and 56*a-c* may simply contain the math configuration files, with the rest of the components (e.g., game logic, etc.) residing in the game engine 64*a-c*. Or there may be some intermediate combination of the above two approaches.

Other wagering game components besides the instruction sets may also be contained in the base game packages 54*a-c* and bonus game packages 56*a-c*. For example, most wagering games use some type audio content, visual content, or other theme related aspects. Examples of such audio and visual contents may include background art/graphics, symbol fonts, sounds/music, characters/avatars, and the like. In accordance with embodiments of the invention, these aspects of the base game and the bonus game may also be contained in the base game packages 54*a-c* and bonus game packages 56*a-c* along with any instruction sets. Alternatively, the audio and/or visual content may be stored locally on the individual gaming machines 10*a-c*. Thus, for example, the same base game package 54*a-c* reproduced on two different gaming machines 10*a-c* may have two different themes, depending on the particular setup of the gaming system.

In addition to selecting the base game packages 54*a-c* and bonus game packages 56*a-c*, in some embodiments, users may also select various game features to accompany the base game packages 54*a-c* and bonus game packages 56*a-c*. Such game features are typically provided as enhancements to the base games and bonus games and may include, for example, various bonus game triggering mechanisms (e.g., bonus symbols, secondary indicia, etc.), payout multipliers, payout frequency, scatter pays, mystery pays, and the like. Other game features may include, for example, different game-ending mechanisms (e.g., number of spins, number of picks, etc.), progressive jackpot levels (e.g., local versus wide area), and the like. Alternatively, one or more game features may be an integral part of the base game and/or bonus game so that they are downloaded automatically by default with each base game package 54*a-c* and bonus game package 56*a-c*.

Figure 5A:
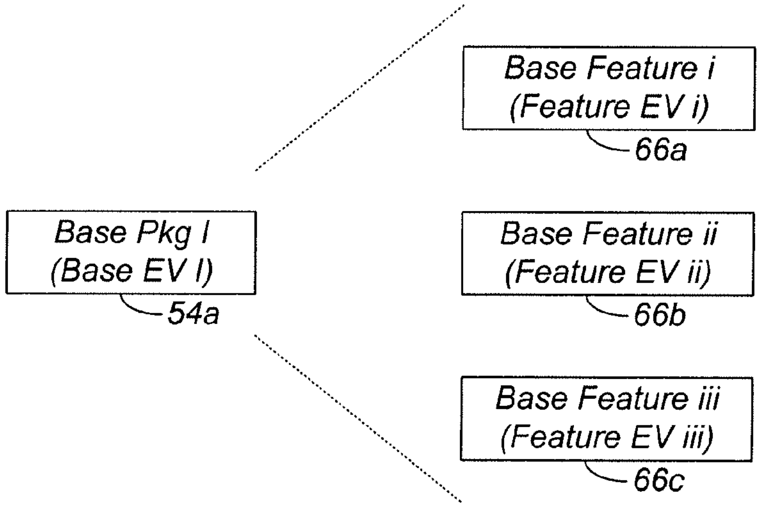
FIGS. 5*a* and 5*b* illustrate an exemplary base game package and an exemplary bonus game package, respectively, according to embodiments of the invention.
Figure 5B:
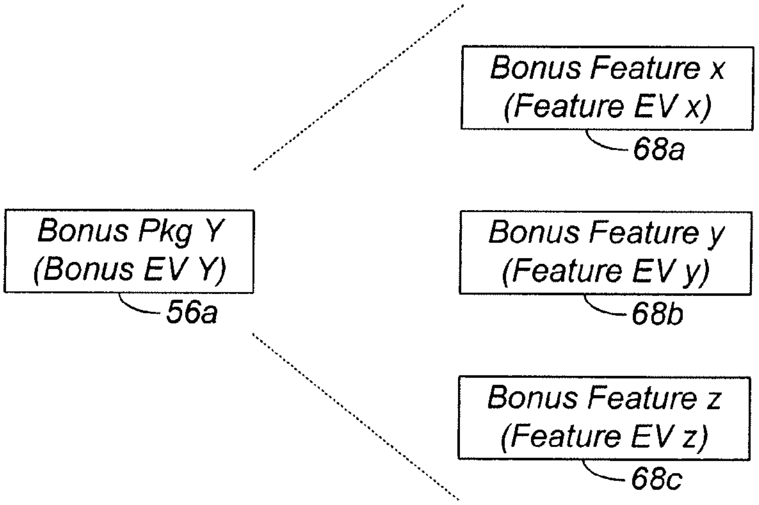

FIGS. 5*a* and 5*b* illustrate an exemplary base game package 54*a* (FIG. 5*a*) and an exemplary bonus game package 56*a* (FIG. 5*b*) according to embodiments of the intention. As can be seen in FIG. 5*a*, the exemplary base game package 54*a* includes a number of base game features 66*a-c* that are presented to the players, casino operators, and/or gaming machine manufacturers when the base game package 54*a* is selected. Similarly in FIG. 5*b*, the exemplary bonus game package 56*a* includes a number of bonus game features 68*a-c* that are presented to the players, casino operators, and/or gaming machine manufacturers when the bonus game package 56*a* is selected. The players, casino operators, and/or gaming machine manufacturers may then choose to activate one or more of these game features 66*a-c* and 68*a-c* as needed.

In some embodiments, depending on the particular base game package 54*a* and bonus game package and 56*a* selected, one or more of the base game features 66*a-c* and/or bonus game features 68*a-c* may not be available for selection by the players, casino operators, and/or gaming machine manufacturers due to compatibility reasons. In other embodiments, one or more of the base game features 66*a-c* and bonus game features 68*a-c* may be displayed (via a user interface) to the players, casino operators, and/or gaming machine manufacturers more prominently, for example, as a result of certain predefined preferences and/or previous selections tracked over time.

Throughout FIGS. 4, 5*a* and 5*b*, it can be seen that each base game package 54*a-c* and bonus game package 56*a-c*, as well as each base game feature 66*a-c* and bonus game feature 68*a-c*, includes an associated expected value (EV) or range of expected values. The expected value, as that term is used in the wagering game art, refers to the average amount that a player may expect to win for each dollar wagered over an extended period of time. Thus, a gaming machine having an expected value of 90 percent means that the player can expect to win an average of $0.90 for each dollar wagered on that gaming machine. Most gaming machines have an overall expected value of around 85-95 percent, with roughly 60-70 percent being allocated to the base game and 15-35 percent being allocated to the bonus game (including about 10 percent for the progressive jackpot and other communal games, when present). This means that for each dollar wagered, the player may expect to win around $0.60-$0.70 from the base game and around $0.15-$0.35 from the bonus game. Note that with the bonus game, the player is likely to win almost every time, as that is the primary reason for having a bonus game. Therefore, the expected value of the bonus game must be distributed in a manner that will account for the high frequency of winning.

In some embodiments, the expected values may be designed to be uniform across each selectable type of component. Thus, every base game may be designed to have the same expected value, every bonus game to have the same expected value, every base game feature to have the same expected value, and every bonus game feature to have the same expected value. In other embodiments, the expected values for one or more of the base games, bonus games, and/or various features may be undefined until they are downloaded to the gaming machines 10*a-c*. The expected values for one or more of these base games, bonus games, and/or various features therefor may thereafter be set based on the expected values of the gaming machines 10*a-c* and the expected values of the other downloaded base games, bonus games, and/or various features therefor. In still other embodiments, however, there may be little or no correlation between the various expected values, depending on the particular application. Therefore, while still falling within their individual acceptable ranges, one or more base games, bonus games, and/or their respective game features may have varied and disparate expected values.

Using varied and disparate expected values can provide more variety and therefore more excitement and enjoyment for players. However, since the base game is independently selectable from the bonus game, it is possible to choose a base game-bonus game combination where the overall expected value is outside the allowed range (e.g., 85-95 percent). This may result in lost revenue to casino operators and gaming machine manufacturers if the overall expected value exceeds the allowed range. On the other hand, falling below the allowed range may cause players to become disenchanted with the gaming machines and may also violate regulatory requirements in some jurisdictions.

Figure 6:
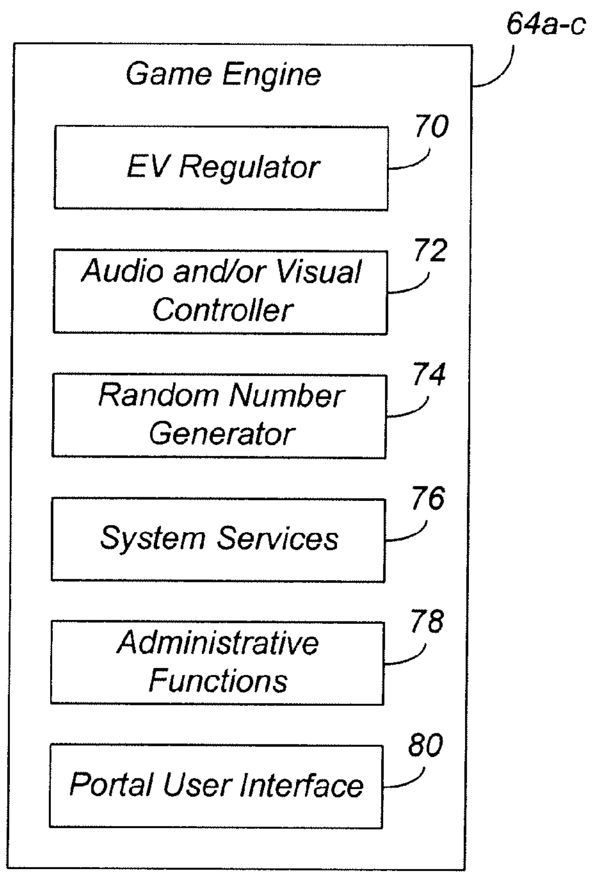
FIG. 6 illustrates an exemplary game engine for a gaming machine according to embodiments of the invention.

Referring now to FIG. 6, in order to mitigate the above results, in some embodiments, an expected value regulator 70 may be provided in the game engine 64*a-c* of each gaming machine 10*a-c*. It is also possible in some embodiments for such an expected value regulator 70 to reside in the portal 58 (FIG. 4) without departing from the scope of the invention. In either case, the expected value regulator 70 functions in the background to ensure that users cannot choose a base game-bonus game combination where the overall expected value exceeds or falls below a predetermined range. Thus, in one implementation, the expected value regulator 70 may be configured to add the expected values contained in each base game package 54*a-c* and bonus game package 56*a-c* selected and determine whether the total expected value is within the allowed range. The expected value regulator 70 may thereafter permit the selected combination if the allowed range is satisfied or else notifies the user that the combination is prohibited.

Sometimes it may be desirable to allow a certain base game-bonus game combination to proceed even when the overall expected value exceeds the targeted range. A casino operator and/or gaming machine manufacturer may wish to do this, for example, as a way to reward particularly active players based on their wagering history or as part of a special event (e.g., a slot machine tournament). In that case, the expected value regulator 70 may provide an option for the casino operator and/or gaming machine manufacturer to temporarily override any prohibition and allow the prohibited combination to proceed for a predetermined period of time (e.g., half an hour, etc.).

Sometimes the choice of which base game packages 54*a-c* may be combined with which bonus game packages 56*a-c* may be set by the game designers. In those instances, the expected value regulator 70 may identify prohibited combinations by referring, for example, to one or more lookup tables instead of evaluating the expected value of each combination. In addition, for certain instances where the overall expected value is close, but does not quite satisfy the targeted expected value or just falls below the allowed range, the expected value regulator 70 may randomly award a mystery prize to the player to compensate for the difference in the actual and targeted expected values.

In some embodiments, it may be possible to eliminate the above expected-value problem altogether by requiring each base game package 54*a-c* and bonus game package 56*a-c*, as well as their respective game features 66*a-c* and 68*a-c*, to be independently funded. Thus, for example, at some point before or during the base game, or when the bonus game is triggered, the player may be asked to place a supplemental wager in order to play the bonus game and/or to activate a certain game feature. The additional wager may then be used to fund the bonus game and/or game feature while the initial wager may be reserved for the base game. In this way, players may choose (and pay for) any combination of base games and bonus games a desire, and may activate any compatible game features they please.

Referring still to FIG. 6, in addition to the expected value regulator 70, the game engine 64*a-c* may also include an audio and/or visual content controller 72 for handling the audio and/or visual content (and other theme related aspects) of the base game and the bonus game. Recall that the audio and/or visual content (and other theme related aspects) may be contained in the base game packages 54*a-c* and bonus game packages 56*a-c* that are downloaded to the gaming machines 10*a-c*, or they may be stored locally at each gaming machine 10*a-c*. For each base game and bonus game package 54*a-c* and 56*a-c*, the audio and/or visual content controller 72 is configured to determine whether audio and/or visual content is present and, if so, apply that audio and/or visual content accordingly. Alternatively, there may be multiple versions of audio and/or visual content in each base game package 54*a-c* and bonus game package 56*a-c*, and the audio and/or visual content controller 72 main allows the player, casino operator, and/or gaming machine manufacturer to choose the particular aversion to apply. If neither the base game package 54*a-c* nor the bonus game package 56*a-c* contains audio and/or visual content, then the audio and/or visual content controller 72 is configured to use the locally stored or default audio and/or visual content.

Also present in the game engine 64*a-c* are at least one random number generator 74, a system services layer 76, and an administrative functions module 78. These functional components are well known to those having ordinary skill in the art and will be described only briefly here. In general, the at least one random number generator 74 in each gaming machine 10*a-c* is responsible for generating random numbers for the base game and bonus game. The system services layer 76 provides systems level services for each gaming machine 10*a-c*, including network connectivity services (i.e., where to go get the base game and/or bonus game packages 54*a-c* and 56*a-c*), program initialization services, operating system services, and the like. The administrative function module 78 is responsible for handling various administrative functions (e.g., processing coin-in data, performing player tracking, etc.) for each gaming machine 10*a-c*. Other functional components known to those having ordinary skill in the art may also be provided in the game engine 64*a-c* without departing from the scope of the invention.

In some embodiments, a user interface 80 (FIG. 4) may be provided in the game engine 64*a-c* for allowing a player to interact with the portal 58. A user interface similar to the portal user interface 80 may also reside in the control systems 62 and/or the portal 58 itself for allowing a casino operator and/or gaming machine manufacturer to interact with the portal 58. Such a portal user interface 80 lets the user select and download one or more base game and/or bonus game packages 54*a-c* and 56*a-c* from the portal 58 to the Gaming machine 10*a-c*. One or more base game and/or bonus game features 66*a-c* and 68*a-c* may also be selected and downloaded from the portal 58 through the portal user interface 80.

Figure 7A:
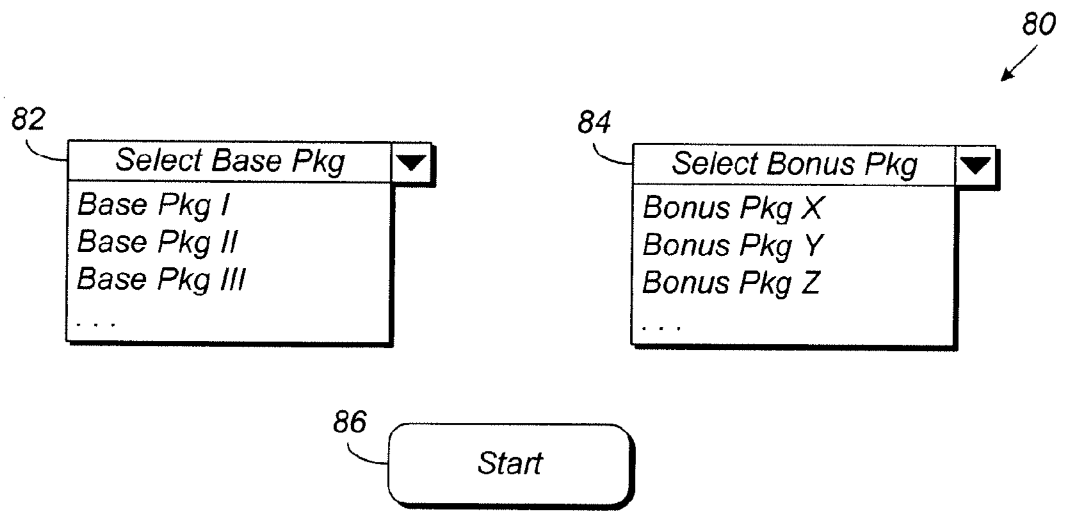
FIGS. 7*a* and 7*b* illustrate a user interface for selectively combining base games and bonus games according to embodiments of the invention.
Figure 7B:
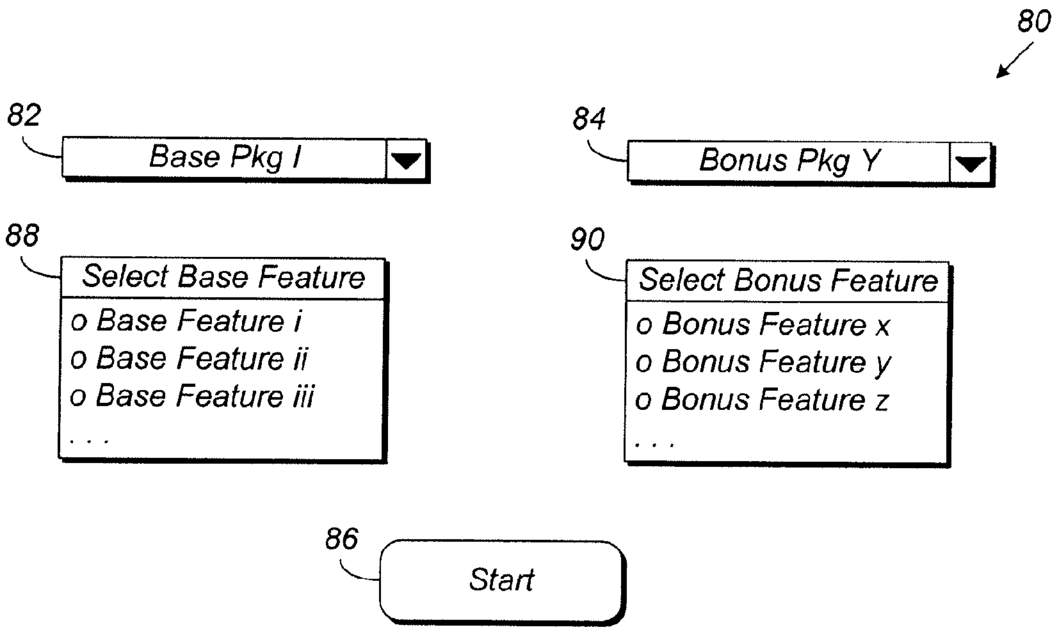

FIGS. 7*a* and 7*b* illustrate an exemplary portal user interface 80 according to embodiments of the invention. Such a portal user interface 80 may be displayed on the gaming machine 10*a-c* (or the control systems 62 and/or the portal 58) upon accessing the portal 58. Referring first to FIG. 7*a*, this particular implementation of the portal user interface 80 includes a first drop-down list 82 for selecting a base game package and a second drop-town list 84 for selecting a bonus game package. Upon clicking on either list 82 and 84, a plurality of base game packages and bonus game packages, respectively, are presented to the user for selection. The base game package may then be selected entirely independently of the bonus game package, and vice versa. Once the base game package and the bonus game package have been selected, a start button 86 allows the user to begin downloading the selected base game package and bonus game package to the gaming machine 10*a-c*.

In some embodiments, the user may also select one or more base game features and/or bonus game features along with the selected base game package and bonus game package. This is illustrated in FIG. 7*b* where, upon selecting the base game package and the bonus game package, the portal user interface 80 presents the user with a first selection box 88 for selecting one or more base game features and a second selection box 90 for selecting one or more bonus game features. Although not expressly shown here, in some embodiments, had any of the user's selection in either FIG. 7*a* or 7*b* resulted in a prohibited combination (e.g., because the overall expected value is either too low or too high), a notification may be displayed informing the user of the prohibited combination. If no prohibited combination resulted, then downloading of the selected base game package and bonus game package, along with any selected game features thereof, is allowed to proceed.

Figure 8:
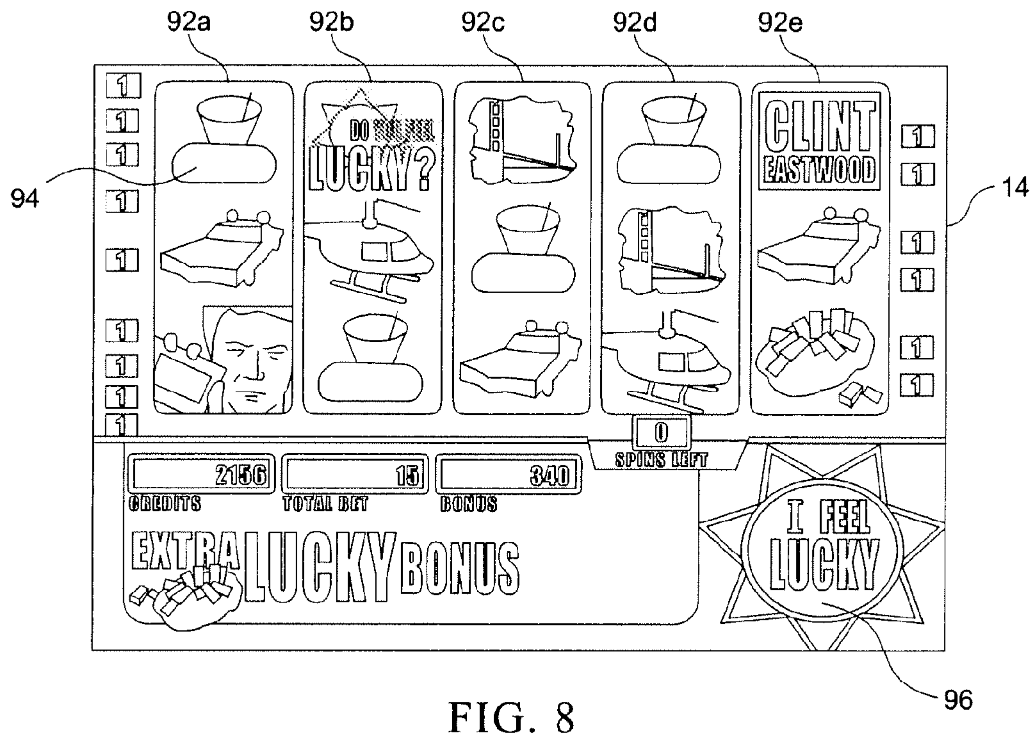
FIG. 8 illustrates an exemplary base game that may be selected and downloaded according to embodiments of the invention.

FIG. 8 illustrates an example of a base game that may be derived from a base game package according to embodiments of the invention. As can be seen here, the user has chosen a base game package containing a video slot machine with five reels 92*a*, 92*b*, 92*c*, 92*d*, and 92*e* and a Dirty Harry™ movie theme. In accordance with embodiments of the invention, each one of the reels 92*a-e*, as well as the individual reel symbols 94 therefor, are provided by the base game package. The Dirty Harry™ audio and/or visual content, on the other hand, may be provided by the base game package and/or the gaming machine. In addition, the user has elected to activate an "I Feel Lucky" multiplier game feature 96 from the base game package, which game feature may be one of several game features presented for selection with the base game package.

Figure 9:
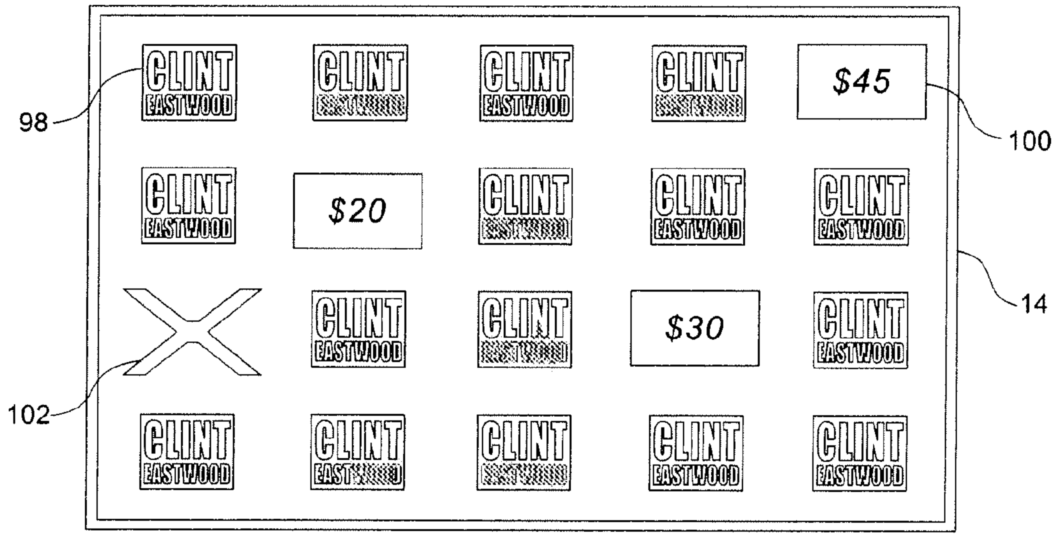
FIG. 9 illustrates an exemplary bonus game that may be selected and downloaded according to embodiments of the invention.

FIG. 9 illustrates an example of a bonus game derived from a bonus game package according to embodiments of the invention. As can be seen here, the user has chosen a player-selection game in which player-selectable elements 98 may be selected by players to reveal credits 100. In accordance with embodiments of the invention, the type and configuration (e.g., number of rows and columns) of the bonus game are provided by the bonus game package. The Dirty Harry™ audio and/or visual content, as before, may be provided by the bonus game package and/or the gaming machine. In some embodiments, however, the Dirty Harry™ audio and/or visual content may instead be taken from the base game package in order to maintain a consistent theme between the base game and the bonus game. In addition, the player, casino operator, and/or gaming machine maker has selected a "pooper" 102 as the game-ending feature from the bonus game package, which game feature is one of several game features presented for selection with the bonus game package.

While the invention has been described with reference to one or more particular embodiments, those skilled in the art will recognize that many changes may be made thereto without departing from the spirit and scope of the description. Each of these embodiments and obvious variations thereof is contemplated as falling within the spirit and scope of the claimed invention, which is set forth in the following claims.

What is claimed is:

1. A gaming system comprising:

at least one storage unit comprising a base package storage and a bonus package storage;

at least one processor; and at least one memory device storing instructions that, when executed by the at least one processor, cause the gaming system to:

accept a selection of a first base game package from a plurality of base game packages stored in the base package storage, the first base game package including a first base game expected value;

accept a selection of a first bonus game package from a plurality of bonus game packages stored in the bonus pack storage, the first bonus game package including a first bonus game expected value;

determine whether a sum of the first base game expected value and the first bonus game expected value is within a predetermined range; and permit the selection of the first base game package and the first bonus game package if the sum is within the predetermined range.

2. The gaming system of claim 1, wherein the at least one storage unit comprises separate storage units for each of the base package storage and the bonus package storage.

3. The gaming system of claim 1, wherein the at least one processor is included in a gaming machine.

4. The gaming system of claim 1, wherein the at least one processor is external to and in communication with a gaming machine.

5. The gaming system of claim 1, wherein the first base game expected value is independent of the first bonus game expected value.

6. The gaming system of claim 5, wherein the first base game expected value is within a base game acceptable value range and the first bonus game expected value is within a bonus game acceptable value range.

7. The gaming system of claim 1, further comprising:

at least one input device configured to receive the selection of the first base game package and the selection of the first bonus game package; and at least one display device;

wherein the instructions, when executed by the at least one processor, further cause the gaming system to:

accept a wager in response to an input via the at least one input device;

randomly generate an outcome of the first base game package;

display the outcome of the first base game package on the at least one display device;

randomly generate an outcome of the first bonus game package; and display the outcome of the first bonus game package on the at least one display device.

8. The gaming system of claim 1, wherein:

the first base game package comprises a plurality of base features;

the first bonus game package comprises a plurality of bonus features; and the instructions, when executed by the at least one processor, further cause the gaming system to:

identify at least one of the plurality of base features compatible with the first bonus game and activate the at least one base feature; or identify at least one of the plurality of bonus features compatible with the first base game and activate the at least one bonus feature.

9. A computer-implemented method in a gaming system, comprising:

receiving via at least one input device a selection of a first base wagering game with a first base game expected value from a plurality of base wagering games of varying base game expected values;

receiving via the at least one input device a selection of a first bonus wagering game with a first bonus game expected value from a plurality of bonus wagering games of varying bonus game expected values;

summing, by at least one of one or more processors, the first base game expected value and the first bonus game expected value;

comparing, by at least one of the one or more processors, the sum of the first base game expected value and the first bonus game expected value to a predetermined expected value range; and if the sum is within the predetermined range, configuring a gaming machine with a combination of the first base game and the first bonus game.

10. The method of claim 9, further comprising:

if the sum is outside of the predetermined range, generating, by at least one of the one or more processors, a notification of prohibited combination.

11. The method of claim 9, further comprising:

if the sum is higher than the predetermined range, evaluating, by at least one of the one or more processors, a player history; and in response to the evaluating the player history, configuring the gaming machine with the combination of the first base game and the first bonus game for a limited period of time.

12. The method of claim 9, further comprising:

if the sum is lower than the predetermined range, configuring the gaming machine with the combination of the first base game and the first bonus game; and randomly awarding a mystery prize.

13. The method of claim 9, further comprising:

if the sum is higher than the predetermined range, configuring the gaming machine with the combination of the first base game and the first bonus game during a tournament.

14. The method of claim 9, further comprising:

receiving a wager;

randomly generating, by at least one of the one or more processors, an outcome of the first base game;

displaying the outcome of the first base game on at least one display device;

randomly generating, by at least one of the one or more processors, an outcome of the first bonus game; and displaying the outcome of the first bonus game on the at least one display device.

15. The method of claim 9, further comprising displaying to a user the results of the comparing.

16. The method of claim 15, wherein the user is a manufacturer or a casino operator.

17. The method of claim 9, further comprising tracking the selection of the first base game and the selection of the first bonus game.

18. A gaming system comprising:

a base game storage comprising a plurality of base games;

a bonus game storage comprising a plurality of bonus games;

a regulator executing on at least one processor, the regulator configured to:

evaluate a combination of a base game selected from the plurality of base games and a bonus game selected from the plurality of bonus games; and identify the combination as a permissible combination or an impermissible combination.

19. The gaming system of claim 18, wherein the regulator comprises:

an adder configured to compute a sum of an expected value of the base game and an expected value of the bonus game; and a comparator configured to compare the sum to a predetermined range;

wherein the regulator is configured to identify the combination as a permissible combination if the sum is within the predetermined range and identify the combination as an impermissible combination if the sum is outside the predetermined range.

20. The gaming system of claim 18, wherein the regulator comprises:

a comparator configured to compare the combination to a lookup table; and wherein the regulator is configured to identify the combination as a permissible combination based on the comparison of the combination to the lookup table.

21. The gaming system of claim 18, further comprising: at least one display device configured to display the identification of the combination as permissible or impermissible.

22. The gaming system of claim 21, wherein:
the gaming system further comprises a gaming machine; and
the regulator is configured to activate the combination of the first base game and the first bonus game at the gaming machine.

23. The gaming system of claim 19, further comprising:
a gaming machine;
wherein, if the sum is lower than the predetermined range, the regulator is configured to activate the combination of the first base game and the first bonus game at the gaming machine; and
the gaming machine is configured to randomly award a mystery prize to compensate for the difference between the sum and an expected value within the predetermined range.

24. The gaming system of claim 18, further comprising:
a user interface;
wherein the at least one processor is configured to:
present to a user via the user interface an indication that the combination is impermissible;
accept a command to override a prohibition of the combination; and
activate the combination at a gaming machine.

25. The gaming system of claim 24, wherein the user is a manufacturer or a casino operator.

* * * * *